United States Patent
Hailpern

(10) Patent No.: US 10,528,569 B2
(45) Date of Patent: Jan. 7, 2020

(54) DATASET BROWSING USING ADDITIVE FILTERS

(71) Applicant: Hewlett Packard Enterprise Development LP, Houston, TX (US)

(72) Inventor: Joshua Hailpern, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 426 days.

(21) Appl. No.: 15/316,857

(22) PCT Filed: Jun. 26, 2014

(86) PCT No.: PCT/US2014/044452
§ 371 (c)(1),
(2) Date: Dec. 7, 2016

(87) PCT Pub. No.: WO2015/199707
PCT Pub. Date: Dec. 30, 2015

(65) Prior Publication Data
US 2017/0140002 A1    May 18, 2017

(51) Int. Cl.
*G06F 16/20*    (2019.01)
*G06F 16/2457*    (2019.01)
*G06F 16/248*    (2019.01)
*G06F 16/28*    (2019.01)

(52) U.S. Cl.
CPC ...... *G06F 16/24573* (2019.01); *G06F 16/248* (2019.01); *G06F 16/285* (2019.01)

(58) Field of Classification Search
CPC . G06F 16/24573; G06F 16/248; G06F 16/285
See application file for complete search history.

(56) References Cited

U.S. PATENT DOCUMENTS

| 2006/0005164 A1 | 1/2006 | Jetter et al. |
| 2008/0208829 A1* | 8/2008 | Limonov ............ G06F 16/168 |
| 2009/0033664 A1 | 2/2009 | Hao et al. |

(Continued)

OTHER PUBLICATIONS

"The Hierarchy of Accounts, Users, Properties, and Views", Research Paper, Jun. 20, 2013, 3 pages.

(Continued)

*Primary Examiner* — Kristopher Andersen
(74) *Attorney, Agent, or Firm* — Hewlett Packard Enterprise Patent Department

(57) ABSTRACT

Examples relate to dataset browsing using additive filters. In some examples, metadata associated with a user-related dataset is processed to obtain explicit information that describes attributes for each data record in the user-related dataset. Further, a semantic analysis of content of the user-related dataset is performed to identify topics. At this stage, the explicit information and the topics are used to generate contextual cues. A dataset display for the user-related dataset is displayed, where the dataset display is empty prior to selection of any of the contextual cues. In response to a selection of a first cue, a dataset display of the user-related dataset is updated to show data records that are associated with the first cue. In response to a selection of a second cue, the dataset display is updated to show data records that are associated with the first cue and the second cue.

15 Claims, 5 Drawing Sheets

(56) References Cited

U.S. PATENT DOCUMENTS

| | | |
|---|---|---|
| 2009/0199079 A1 | 8/2009 | Pratley |
| 2009/0254847 A1 | 10/2009 | Counts et al. |
| 2010/0083173 A1 | 4/2010 | Germann et al. |
| 2011/0191344 A1 | 8/2011 | Jin et al. |
| 2013/0036117 A1 | 2/2013 | Fisher et al. |
| 2013/0218898 A1 | 8/2013 | Ragavan et al. |

OTHER PUBLICATIONS

Mlejnek, M., "Feature-Based Volume Rendering of Simulation Data", Research Paper, Aug. 17, 2013, 9 pages.
PCT Search Report/Written Opinion, Application No. PCT/US2014/044452 dated Feb. 4, 2015, 9 pages.

\* cited by examiner

DATASET BROWSING USING ADDITIVE FILTERS

BACKGROUND

Information overload in large datasets is a common issue, especially when related to personal data (e.g., files) or communication data (e.g., emails). Searching such datasets typically involves entering keywords or metadata to proactively refine the results of a search. For example, a user may enter keywords to search through emails stored in their inbox. In this example, special operators such as "AND" and "OR" can be used to perform more complicated searches of the inbox.

BRIEF DESCRIPTION OF THE DRAWINGS

The following detailed description references the drawings, wherein.

DETAILED DESCRIPTION

As detailed above, keyword searches are typically used to refine dataset results for a user or users simply browse long lists of data entries (e.g. email inbox or windows explorer). However, examples described herein provide a viewing technique for that does not include searches with keywords or prolonged browsing/exploration. Specifically, the examples describe a technique based on various features of the dataset. Further, while there are many possible features that can be used to refine the dataset, common features are selected to display based on criteria (e.g., most commonly used, current data context, etc.) such that the full list of features is hidden unless revealed for advance refinement.

Examples disclosed herein provide dataset browsing using additive filters. For example, in some cases, metadata associated with a user-related dataset is processed to obtain explicit information that describes attributes for each data record in the user-related dataset. Further, a semantic analysis of content of the user-related dataset is performed to identify topics. At this stage, the explicit information and the topics are used to generate contextual cues. A dataset display for the user-related dataset is displayed, where the dataset display is empty prior to selection of any of the contextual cues. In response to a selection of a first cue, a dataset display of the user-related dataset is updated to show data records that are associated with the first cue. In response to a selection of a second cue, the dataset display is updated to show data records that are associated with the first cue and the second cue.

Figure 1:
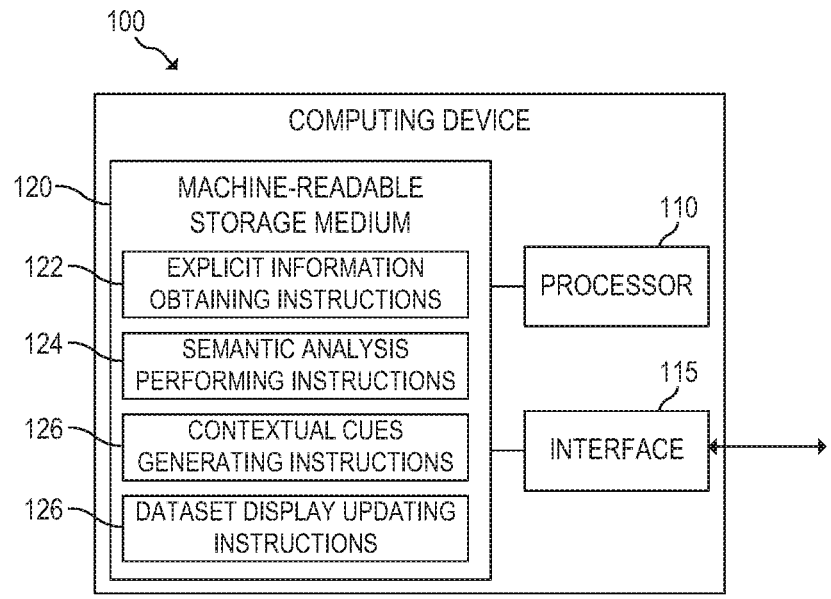
FIG. 1 is a block diagram of an example computing device for providing dataset browsing using additive filters.

Referring now to the drawings, FIG. 1 is a block diagram of an example computing device 100 for providing dataset browsing using additive filters. Computing device 100 may be any computing device such as a desktop computer, a server, a notebook computer, a tablet, etc. In the example of FIG. 1, computing device 100 includes a processor 110, an interface 115, and a machine-readable storage medium 120.

Processor 110 may be any number of central processing units (CPUs), microprocessors, and/or other hardware devices suitable for retrieval and execution of instructions stored in machine-readable storage medium 120. Processor 110 may fetch, decode, and execute instructions 122, 124, 126, 128 to provide dataset browsing using additive filters, as described below. As an alternative or in addition to retrieving and executing instructions, processor 110 may include any number of electronic circuits comprising a number of electronic components for performing the functionality of instructions 122, 124, 126, and/or 128.

Interface 115 may include a number of electronic components for communicating with other computing devices. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the other computing device. Alternatively, interface 115 may be a wireless interface, such as a wireless local area network (WLAN) interface or a near-field communication (NFC) interface. In operation, as detailed below, interface 115 may be used to send and receive data, such as dataset data, to and from a corresponding interface of another computing device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for providing dataset browsing using additive filters.

Explicit information obtaining instructions 122 obtains explicit information from metadata of a user-related dataset. Examples of a user-related dataset include a collection of email, files, database records, etc. that are stored locally and/or stored on a remote device accessed through interface 115. The dataset is user-related in that it includes data that is personal to the user such as the user's email, files prepared for use by the user, etc. In other words, the dataset is not typically big data that includes huge volumes of data for enabling statistical analysis, enhanced decision making, etc. The metadata provides attributes of data records (e.g., email, file, database record, etc.) in the dataset. For example in the case of email, metadata attributes may include a description of the sender and/or receivers (e.g., a user profile of the sender and/or receivers), corporate hierarchy extracted from a user directory associated with the email, etc. In this example, other users in the same business group as the user can be identified in the metadata and prioritized as highly relevant features of the dataset.

Semantic analysis performing instructions 124 performs a semantic analysis of content in the dataset to obtain implicit information of the dataset. Semantic analysis may analyze content of a document to identify topics that are related to the document (e.g., latent semantic analysis, probabilistic latent semantic analysis, etc.). In this case, the topics for a document (e.g., email, file, etc.) may be determined based on a probability distribution over words in the content. For example, a distribution of words related to health, medicine, etc. can indicate a topic that is thematically related to health care.

Contextual cues generating instructions 126 generates contextual cues based on the explicit information and the topics. Contextual cues can be presented to the user as potential filters for the dataset. For example, the contextual cues can be presented in an email application as potential filters for the user's email. The user can then select any number of contextual cues to apply additive filters to the email. Initially, an empty set (i.e., null box) may be displayed in a dataset display of the email application so that applicable emails are only shown after at least one contextual cue is selected.

Dataset display updating instructions 128 updates the dataset display based on the selected contextual cues. Specifically, as contextual cues are selected or unselected, the dataset display is updated to display data records in the dataset that satisfy all of the selected contextual cues. In some cases, the display of the contextual cues in the user application can also be dynamically updated based on the selection of contextual cues. For example, a selection of a topic in the contextual cues may restrict the other contextual cues displayed to cues that are related to the topic.

Figure 2:
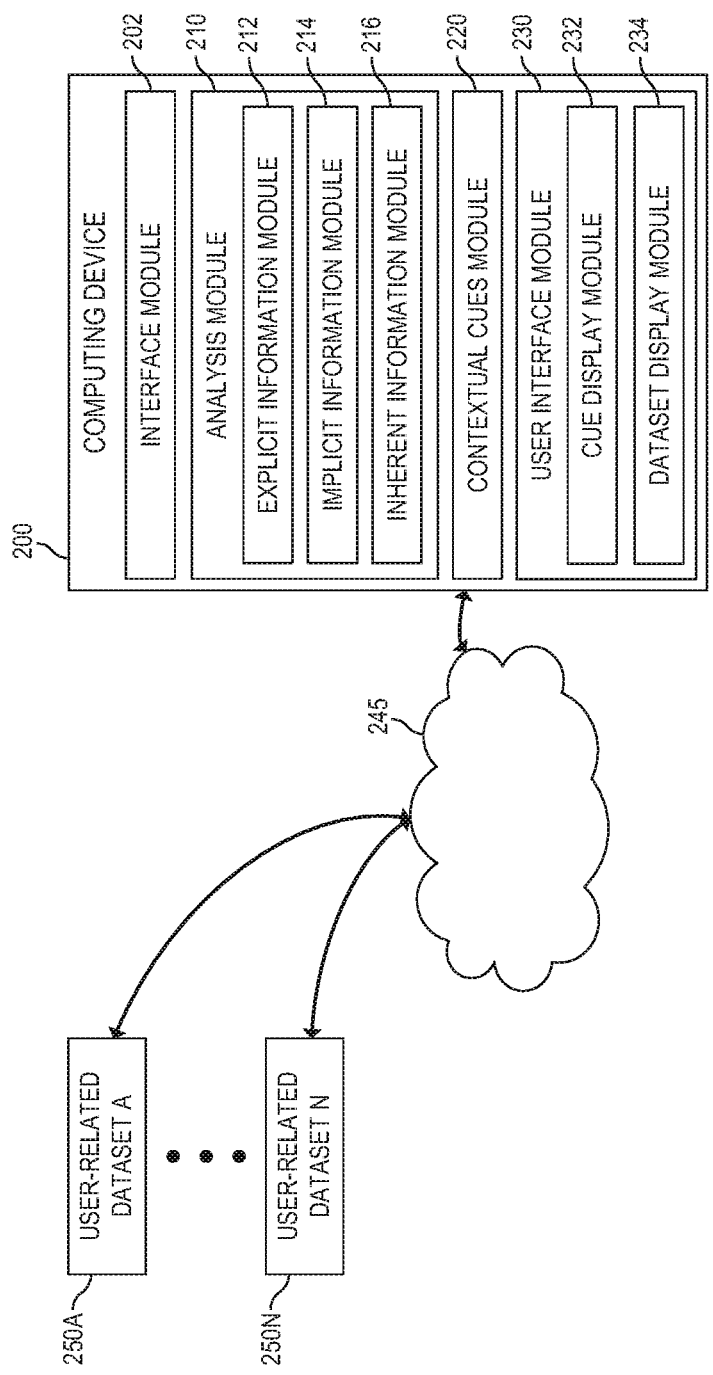
FIG. 2 is a block diagram of an example computing device in communication with datasets for providing dataset browsing using additive filters.

FIG. 2 is a block diagram of an example computing device 200 in communication via a network 245 with user-related datasets (e.g., user-related dataset A 250A, user-related dataset N 250N). As illustrated in FIG. 2 and described below, computing device 200 may communicate with datasets to provide dataset browsing using additive filters. As illustrated, computing device 200 may include a number of modules 202-234. Each of the modules may include a series of instructions encoded on a machine-readable storage medium and executable by a processor of the computing device 200. In addition or as an alternative, each module may include any number of hardware devices including electronic circuitry for implementing the functionality described below.

As with computing device 100 of FIG. 1, computing device 200 may be a desktop computer, a server, a notebook computer, a tablet, or any other device suitable for executing the functionality described below. As detailed below, computing device 200 may include a series of modules 202-234 for enabling dataset browsing using additive filters.

Interface module 202 may manage communications with the datasets (e.g., user-related dataset A 250A, user-related dataset N 250N). Specifically, the interface module 202 may initiate connections with the datasets and then send or receive dataset data to/from the datasets. In some cases, all or a portion of the datasets may be stored locally on computing device 200 so that the functionality described below can be performed without the use of network 245.

Analysis module 210 may perform analysis of dataset data in the datasets (e.g., user-related dataset A 250A, user-related dataset N 250N). Although the components of analysis module 210 are described in detail below, additional details regarding an example implementation of module 210 are provided above in connection with instructions 122 and 124 of FIG. 1.

Explicit information module 212 extracts explicit information from metadata of a dataset (e.g., user-related dataset A 250A, user-related dataset N 250N). The metadata may include any number of attributes related to the dataset such as last modified time, last modified date, sender, receiver, user directory profiles, workflow information, etc. For example, the explicit information can provide a corporate context for data in the dataset such as the users in a business group that are accessing a particular data record, a manager responsible for a particular data record, etc.

Implicit information module 214 performs a semantic analysis of the dataset to determine topics (i.e., implicit information) for data records. The semantic analysis may use probability distributions of words in content of the data records to assign topics to each data record. Specifically, multiple topics can be proportionally assigned to a data record. For example, an email may be determined to be 90% about software and 10% about holiday planning.

Inherent information module 216 manages inherent information of a user application (not shown) related to a dataset. Examples of user applications include an email client, a document management application, a workflow application, etc. The user application can have inherent properties that can be used to filter data records in the dataset. For example, emails displayed in an email client can be filtered based on whether each email has an attachment, the priority of each email, the folder storing each email, etc.

Each of the modules 212, 214, 216 may continuously update their information as described above when the dataset is modified. For example, as emails are received, new topics can be determined based on the emails. In this example, when the email client is upgraded, the inherent information may be updated to reflect new features in the email client.

Contextual cues module 220 determines contextual cues based on the implicit, explicit, and inherent information obtained by analysis module 210. Although the components of contextual cues module 220 are described in detail below, additional details regarding an example implementation of module 220 are provided above in connection with instructions 126 of FIG. 1. Each of the contextual cues may correspond to a topic, an attribute in the explicit information or inherent information. Further, each of the contextual cues may be prioritized based on the cue's importance. For example, each contextual cue may be prioritized based on the quantity of data records associated with the contextual cue (i.e., a cue associated with more data records has a higher priority).

Contextual cues module 220 may also determine contextual cues based on historical cue selections of the user. For example, if the user selects a pair of contextual cues with a high frequency, the pair of contextual cues can be combined into a single cue (e.g., "A First Topic+A Second Topic", "A First Employee+A Second Employee", etc.).

User interface module 230 may manage a dataset display of the dataset. Although the components of user interface module 230 are described in detail below, additional details regarding an example implementation of module 230 are provided above in connection with instructions 128 of FIG. 1. User interface module 230 may be a component of the user application described above.

Cue display module 232 may manage the display of contextual cues for selection by the user. For example, the contextual cues may be categorized (e.g., topics, folders, people, workflow stages, etc.) and displayed under subheadings according to their category. In this example, the highest priority entries in each of the categories may be initially displayed for selection. Cue display module 232 allows the user to toggle selections of the contextual cues. When a cue selection is toggled on, the contextual cue is added as a filter for the data set and vice versa. Cue display module 232 can also allow a user to expand a category so that more contextual cues in the category can be viewed.

In some cases, selected contextual cues can be added with an "OR" operand instead of an "AND" operand. The operand applied to a selected cue may be determined based on the number of results in the filtered data set. For example, if an "AND" operand would result in no records, an "OR" operand may be applied so that some results can be found in the data set.

Dataset display module 234 may manage the display of the dataset. Initially, a dataset display for displaying data records may be empty because no contextual cues are selected. As contextual cues are selected, the dataset display is updated to include data records that satisfy the selected contextual cues. The user may select data records in the dataset display to perform actions such as detailed displays, editing, workflow actions (e.g., respond to email, close task, etc.).

Datasets (e.g., user-related dataset A 250A, user-related dataset N 250N) may include datasets of user-related data such as emails, tasks, documents, files, database records, etc. Datasets (e.g., user-related dataset A 250A, user-related dataset N 250N) may provide access to the database records to the user application, etc. In some cases, datasets (e.g., user-related dataset A 250A, user-related dataset N 250N) can be stored locally on computing device 200 rather than on a network as shown in FIG. 2.

Figure 3:
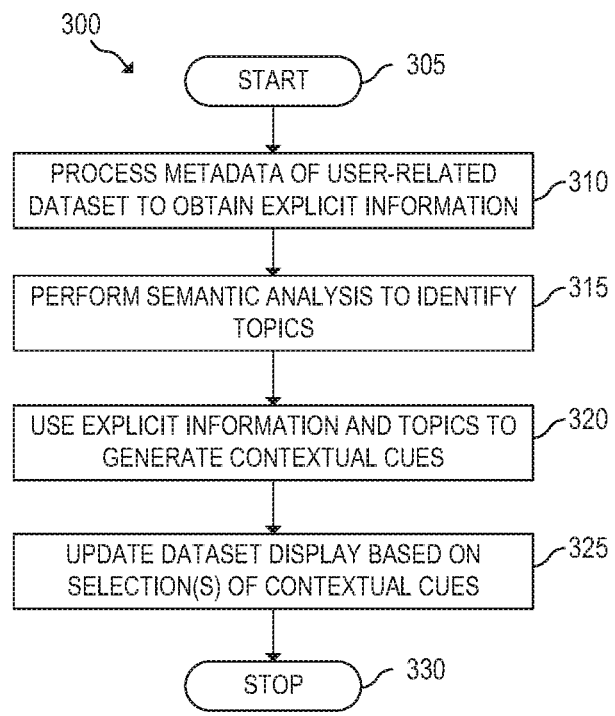
FIG. 3 is a flowchart of an example method for execution by a computing device for providing dataset browsing using additive filters.

FIG. 3 is a flowchart of an example method 300 for execution by a computing device 100 for providing dataset browsing using additive filters. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 obtains explicit information from metadata of a user-related dataset. The metadata provides attributes of data records (e.g., email, file, database record, etc.) in the dataset. In block 315, computing device 100 performs a semantic analysis of content in the dataset to obtain implicit information of the dataset. The semantic analysis analyzes content of documents in the dataset to identify topics that are related to the documents.

In block 320, contextual cues are generated based on the explicit information and the topics. The contextual cues can be presented to the user as potential filters for the dataset. In block 325, a dataset display is updated based on selected contextual cues. Specifically, as contextual cues are selected or unselected, the dataset display is updated to display data records in the dataset that satisfy all of the selected contextual cues. Method 300 may then continue to block 330, where method 300 may stop.

Figure 4:
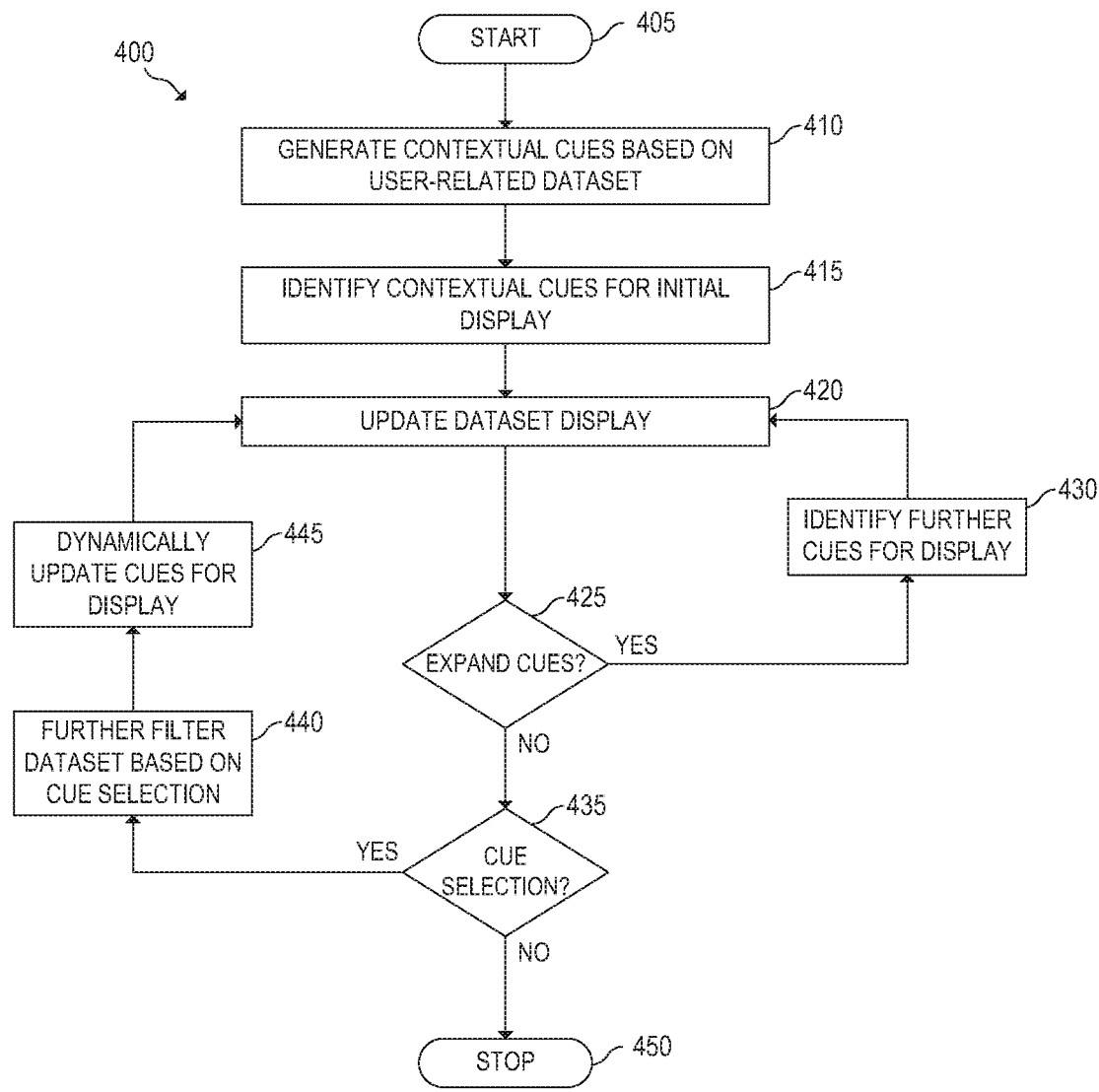
FIG. 4 is a flowchart of an example method for execution by a computing device for updating a dataset display during a browsing session.

FIG. 4 is a flowchart of an example method 400 for execution by a computing device 100 for updating a dataset display during a browsing session. Although execution of method 400 is described below with reference to computing device 100 of FIG. 1, other suitable devices for execution of method 400 may be used, such as computing device 200 of FIG. 2. Method 400 may be implemented in the form of executable instructions stored on a machine-readable storage medium, such as storage medium 120, and/or in the form of electronic circuitry.

Method 400 may start in block 405 and continue to block 410, where computing device 100 contextual cues are generated based on a user-related dataset. Specifically, explicit, implicit, and inherent information may be extracted from the dataset and then used to generate the contextual cues. In block 415, contextual cues that are to be initially displayed are selected. For example, the contextual cues that are determined to have the highest priorities may be displayed in a user application associated with the dataset.

In block 420, the dataset display of the dataset is updated. If no contextual cues have been selected, the dataset display is empty to show that the user has not made selections to filter the data. If contextual cues have been selected, the dataset display is updated to show data records that match the selected contextual cues as described below.

In block 425, computing device 100 determines if the user has requested for the contextual cues to be expanded. If the user has requested expanded contextual cues, further contextual cues for displaying in the user application are identified in block 430. For example, the user may select to see more people are topics so that additional selections are available. If the user has not requested expanded contextual cues, computing device 100 determines if the user has made a cue selection in block 435. Method 400 may then return to 420, where the cue display is updated to reflect the expanded set of cues. If a cue has not been selected, method 400 may then continue to block 450, where method 400 may stop.

If a cue has been selected, computing device 100 further filters the dataset based on the selected contextual cues in block 440. In other words, the dataset is filtered by the currently selected set of contextual cues. In block 445, the contextual cues displayed in the user application may be dynamically updated based on the selected cues. For example, only contextual cues that exist in the filtered dataset can be displayed so that the user is not distracted by irrelevant contextual cues. Method 400 may then return to 420, where the dataset display is updated to reflect the filtered dataset.

Figure 5A:
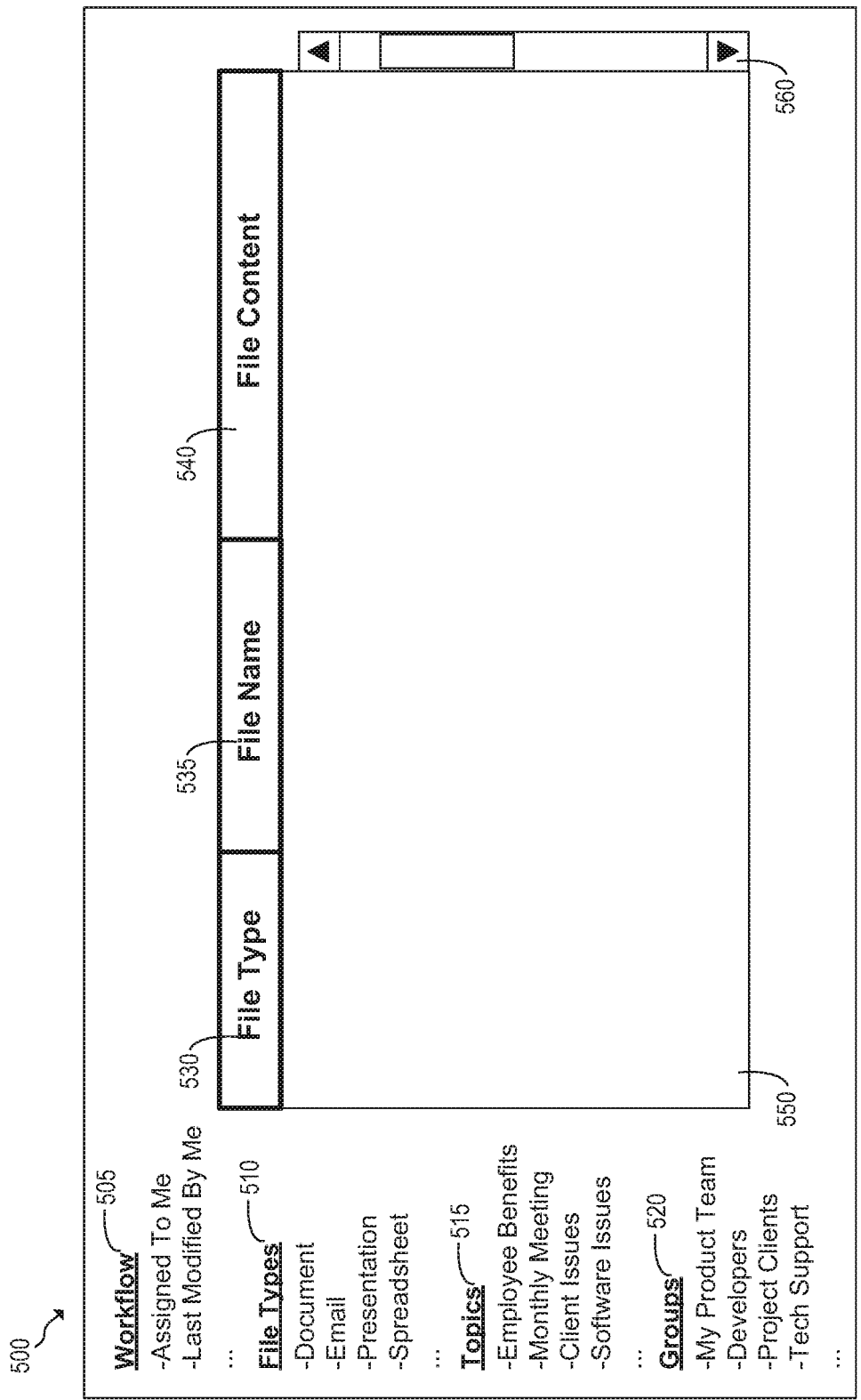
FIGS. 5A and 5B is a diagram of an example user interface of a dataset browsing application in which contextual cues and data records are displayed.
Figure 5B:
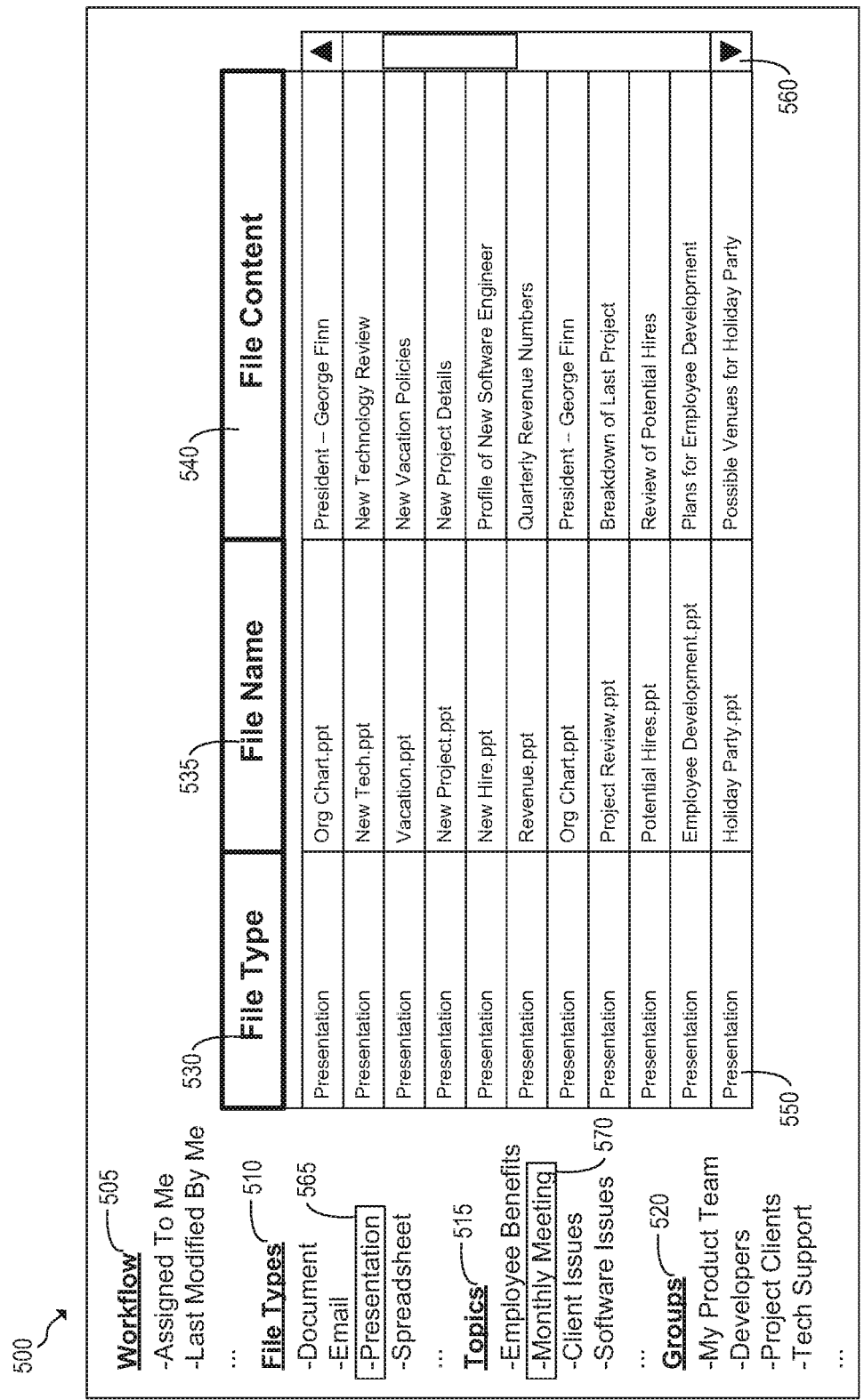

FIGS. 5A and 5B are diagrams of an example user interface 500 of a user application in which a dataset display 550 and contextual cues 505, 510, 515, 520 are shown. As depicted in FIG. 5A, the user interface 500 includes four categories of contextual cues, workflow 505, file types 510, topics 515, and groups 520. In this example, the dataset is a set of files being managed by, for example, a file management system. Workflow category 505 includes "Assigned To Me" and "Last Modified By Me." File types category 510 includes document, email, presentation, and spreadsheet file types for the set of files. Topics category 515 shows high priority topics of the files such as "Employee Benefits," "Monthly Meeting," "Client Issues," and "Software Issues." Groups 520 shows corporate groups determined based on a user directory and including "My Product Team," "Developers," "Project Clients," and "Tech Support". In this example, workflow category 505 shows cues related to inherent information, file types category 510 and groups category 520 show cues related to explicit information, and topics category 515 shows cues related to implicit information.

Dataset display 550 shows three attributes 530, 535, 540 of the set of files. In this example, the attributes include file type 530, file name 535, and file content 540. Initially, no files are shown in dataset display 550 because no contextual cues are selected. The user interface 500 also includes a scroll bar for 560 for browsing entries in dataset display 550.

In FIG. 5B, the user interface 500 shows two selections 565, 570 of contextual cues. The user may select or deselect any number of contextual cues shown in the user interface 500. Dataset display 550 is updated to show files that are related to the selected contextual cues 565, 570. In this example, the files are presentations that are associated with a "Monthly Meeting" topic. The user may select the file entries in dataset display 550 to initiate application actions for the selected file entries.

The foregoing disclosure describes a number of examples for providing dataset browsing using additive filters. In this manner, the examples disclosed herein enable additive filters for dataset browsing by using contextual cues that are based on implicit, explicit, and inherent information associated with a dataset.

I claim:

1. A method for dataset browsing using additive filters, the method comprising:
processing metadata associated with a user-related dataset to obtain explicit information that describes a plurality of attributes for each data record in the user-related dataset;
performing a semantic analysis of content of the user-related dataset to identify a plurality of topics;
using the explicit information and the plurality of topics to generate a plurality of contextual cues;
display a dataset display for the user-related dataset, wherein the dataset display is empty prior to selection of any of the plurality of contextual cues;
in response to a selection of a first cue of the plurality of contextual cues, updating the dataset display of the user-related dataset to show data records that are associated with the first cue; and
in response to a selection of a second cue of the plurality of contextual cues, updating the dataset display to show data records that are associated with the first cue and the second cue.

2. The method of claim 1, wherein the user-related dataset is personal data related to a user, and wherein the explicit information describes characteristics of the user.

3. The method of claim 1, wherein the plurality of contextual cues are generated further using inherent information that describes characteristics of a user application for providing access to the data set.

4. The method of claim 1, further comprising:
simultaneously displaying a cue subset of the plurality of contextual cues, wherein cues of the cue subset are determined to have a higher probability of being relevant to a user; and
in response to the selection of the first cue, updating a cue display of the cue subset to show cues that are related to the first cue.

5. The method of claim 1, further comprising:
in response to a deselection of the first cue, updating the dataset display to show data records that are associated with the second cue.

6. A system for dataset browsing using additive filters, the system comprising:
a storage device to store a user-related dataset; and
a processor to:
process metadata associated with a user-related dataset to obtain explicit information that describes a plurality of attributes for each data record in the user-related dataset;
perform a semantic analysis of content of the user-related dataset to identify a plurality of topics;
use the explicit information and the plurality of topics to generate a plurality of contextual cues;
display a dataset display for the user-related dataset, wherein the dataset display is empty prior to selection of any of the plurality of contextual cues;
in response to a selection of a first cue of the plurality of contextual cues, update the dataset display of the user-related dataset to show data records that are associated with the first cue; and
in response to a selection of a second cue of the plurality of contextual cues, update the dataset display to show data records that are associated with the first cue and the second cue.

7. The system of claim 6, wherein the dataset display is empty prior to the selection of the first cue.

8. The system of claim 6, wherein the user-related dataset is personal data related to a user, and wherein the explicit information describes characteristics of the user.

9. The system of claim 6, wherein the plurality of contextual cues are generated further using inherent information that describes characteristics of a user application for providing access to the data set.

10. The system of claim 6, wherein the processor is further to:
simultaneously display a cue subset of the plurality of contextual cues, wherein cues of the cue subset are determined to have a higher probability of being relevant to a user; and
in response to the selection of the first cue, update a cue display of the cue subset to show cues that are related to the first cue.

11. The system of claim 6, wherein the processor is further to:
in response to a deselection of the first cue, update the dataset display to show data records that are associated with the second cue.

12. A non-transitory machine-readable storage medium encoded with instructions executable by a processor for dataset browsing using additive filters, the machine-readable storage medium comprising instructions to:
process metadata associated with a user-related dataset to obtain explicit information that describes a plurality of attributes for each data record in the user-related dataset;
perform a semantic analysis of content of the user-related dataset to identify a plurality of topics;
use the explicit information and the plurality of topics to generate a plurality of contextual cues;
simultaneously display a cue subset of the plurality of contextual cues and a dataset display of the user-related data, wherein cues of the cue subset are determined to have a higher probability of being relevant to a user, and wherein the dataset display is empty prior to selection of any of the plurality of contextual cues;
in response to a selection of a first cue of the plurality of contextual cues, update the dataset display of the user-related dataset to show data records that are associated with the first cue; and
in response to a selection of a second cue of the plurality of contextual cues, update the dataset display to show data records that are associated with the first cue and the second cue.

13. The non-transitory machine-readable storage medium of claim 12, wherein the user-related dataset is personal data related to a user, and wherein the explicit information describes characteristics of the user.

14. The non-transitory machine-readable storage medium of claim 12, wherein the plurality of contextual cues are generated further using inherent information that describes characteristics of a user application for providing access to the data set.

15. The non-transitory machine-readable storage medium of claim 12, wherein the processor is further to:
   in response to the selection of the first cue, update a cue display of the cue subset to show cues that are related to the first cue.

* * * * *